Sept. 5, 1961   B. N. WALLIS   2,998,637
BEARINGS
Filed Aug. 3, 1959

INVENTOR:
BARNES N. WALLIS

BY: *Morse, Mille & Nolte*

ATTORNEYS

United States Patent Office 2,998,637
Patented Sept. 5, 1961

2,998,637
BEARINGS
Barnes N. Wallis, Effingham, England, assignor to Vickers-Armstrongs (Aircraft) Limited, London, England
Filed Aug. 3, 1959, Ser. No. 831,018
6 Claims. (Cl. 29—149.5)

The invention is concerned with the manufacture of bearings the working faces whereof have a double curvature.

The suitability of polytetrafluorethylene (hereinafter referred to by the abbreviation PTFE) for bearing members, due to its low coefficient of friction in an unlubricated condition, is well-known. This substance is however only available to the engineer in the form of a thin layer or coating applied to the surface of a suitably treated strip of steel or other metal plate, and although such a material may be utilised where the required bearing is flat or has only one degree of curvature, it has not hitherto been thought suitable for bearings of spherical, paraboloidal or other undevelopable shapes. It will be understood that, even were PTFE-coated plate of sufficient width available, a spherical or like bearing of uniform thickness could not be made by pressing such a plate into a former of the desired shape.

With the object of providing a solution of this problem, the invention proposes that a bearing of double curvature should be made by the method consisting of the steps of (a) cutting from strips of PTFE-faced metal plate a number of segments into elements so shaped that when formed to the required double curvature the boundaries are "lines of latitude and longitude," (b) incising on the reverse sides of said elements two intersecting sets of closely spaced lines, (c) forming each element to the requisite curvature by pressing or gently tapping with a soft mallet into a female carrier which has been accurately machined to the desired ultimate shape, (d) assembling the elements in the carrier and (e) bonding the assembly to a shaped support by a suitable adhesive, in such manner that the faced sides of the elements constitute collectively the desired bearing.

The object and advantages of the invention will become apparent and the invention will be fully understood from the following description and drawings in which.

Figures 1, 2, 3, 4, 5, 6:
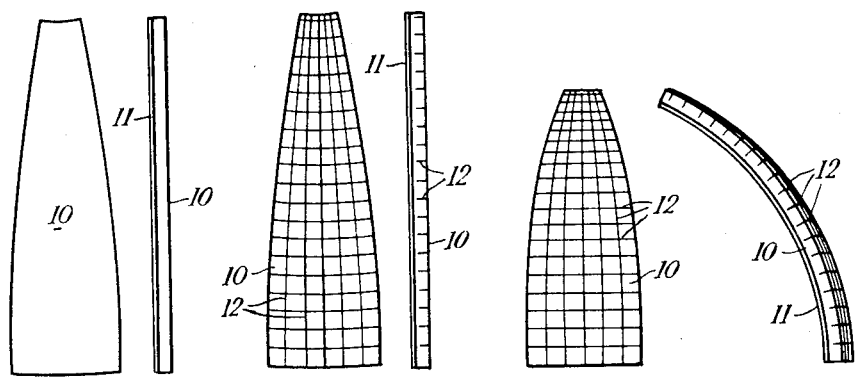
FIG. 1 is a front elevation view of a single bearing element prior to forming.
FIG. 2 is a side elevation view of FIG. 1.
FIG. 3 is a front elevation view similar to FIG. 1, showing the element after the metallic side has been incised.
FIG. 4 is a side elevation view of FIG. 3.
FIG. 5 is a front elevation view of the element of FIG. 3 after it has been shaped in a mold.
FIG. 6 is a side elevation view of FIG. 5.
Figure 7:
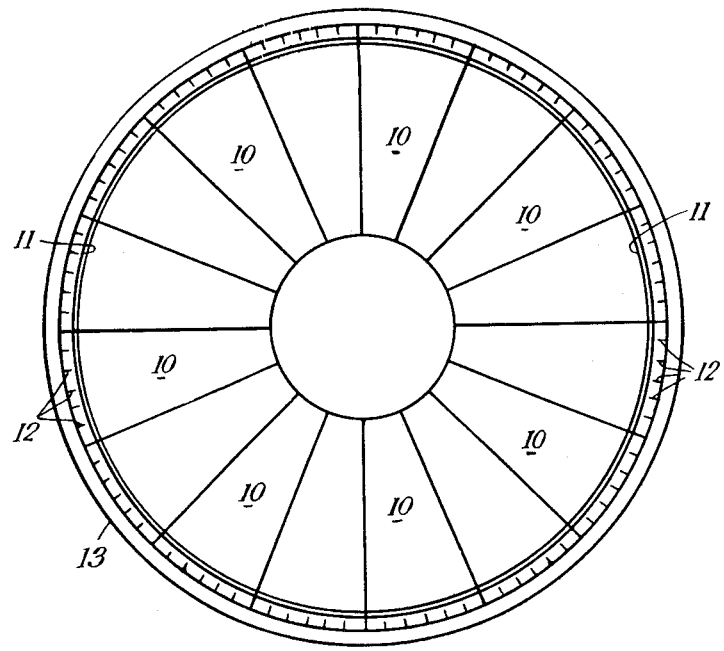
FIG. 7 is a top plan view showing a plurality of shaped segments as assembled into a female spherical bearing.

Referring to the drawings, a single element or segment 10 of metal plate is shown having a surface coating 11 of PTFE. After a plurality of incised relieving lines 12 have been cut into the metallic side of the element 10 (FIGS. 3 and 4), each element is shaped by pressing it into a female mold to give it the compound curved contour of FIGS. 5 and 6. Thereafter, a plurality of shaped segments 10 are assembled into a female carrier 13 for bonding thereto to form the desired female spherical bearing.

In the case of a female bearing the female carrier may constitute the shaped support to which the elements are bonded; for a male bearing the assembly is bonded to a separate male support so that the whole may be withdrawn from the female carrier.

Before the elements are asembled in the female carrier they are preferably mounted with the reverse sides outwards upon a suitable male support and there ground and lapped on the reverse sides, so that the latter will conform as nearly as possible to the inner surface of the female carrier when assembled therein.

The PTFE-faced metal elements are preferably so shaped that when, after the aforesaid shaping operation, they are assembled in the female carrier, the lateral edges of adjacent elements are in contact throughout their length, so that the collective assembly presents a substantially continuous bearing surface.

The incised lines on the reverse sides of the elements, the purpose of which is to relieve the strains induced in the plates by the shaping operation and to enable them to assume the required double curvature without suffering appreciable changes of thickness, are conveniently arranged so that they follow "lines of latitude and longitude" in the ultimate shape.

Bearings made in accordance with this invention are particularly suitable for use in cases where the resultant of a complex system of applied forces may vary in direction from time to time.

What I claim as my invention and desire to secure by Letters Patent is:

1. The process of making a bearing of double curvature, consisting of the steps of (a) cutting from strips of metal plate faced with PTFE upon a single surface a number of segments into elements so shaped that when formed to the required double curvature the boundaries are "lines of latitude and longitude," (b) incising on the metallic sides of said elements two intersecting sets of closely spaced lines, (c) forming each element to the requisite curvature by pressing or gently tapping with a soft mallet into a female carrier which has been accurately machined to the desired ultimate shape, (d) assembling the elements in the carrier and (e) bonding the metallic surface of the assembled elements to a shaped support by a suitable adhesive, in such manner that the PTFE faced sides of the elements constitute collectively the desired bearing.

2. The process claimed in claim 1, which includes the step of mounting the formed elements (before assembling them in the female carrier) upon a male support, and grinding and lapping their metallic sides.

3. The process claimed in claim 1 in which, the elemeans are cut, so that after forming, when the elements are assembled in the female carrier, the lateral edges of adjacent elements are in contact throughout their length.

4. The process claimed in claim 1, wherein the lines incised on the metallic sides of the elements are arranged so that they follow "lines of latitude and longitude" in the ultimate shape.

5. The process of making a bearing of double curvature, consisting of the steps of (a) cutting from strips of metal plate faced with PTFE upon a single surface a number of segments into elements so shaped that when formed to the required double curvature the boundaries are "lines of latitude and longitude," (b) incising on the metallic sides of said elements two intersecting sets of closely spaced lines, (c) forming each element to the requisite curvature by pressing or gently tapping with a soft mallet into a female carrier which has been accurately machined to the desired ultimate double curvature shape, (d) assembling the elements in the carrier and (e) bonding the metallic surface of the assembled elements to said carrier by a suitable adhesive, in such manner that the concave PTFE sides of the elements constitute collectively a female bearing.

6. The process of making a bearing of double curvature, consisting of the steps of (a) cutting from strips of metal plate faced with PTFE upon a single surface a number of segments into elements so shaped that when formed to the required double curvature the boundaries are "lines of longitude and latitude," (b) incising on the metallic sides of said elements two intersecting sets of closely spaced lines, (c) forming each element to the requisite curvature by pressing or gently tapping the metallic sides of each element with a soft mallet into a female carrier which has been accurately machined to the desired ultimate double curvature shape (d) assembling the elements in the carrier and (e) bonding the concave surface of the assembly to a separate male support by a suitable adhesive, in such manner that the convex PTFE sides of the elements constitute collectively a male bearing.

References Cited in the file of this patent
UNITED STATES PATENTS

| | | |
|---|---|---|
| 1,320,563 | Klocke | May 6, 1919 |
| 2,060,034 | Chandler | Nov. 10, 1936 |
| 2,324,083 | Holmes | July 13, 1943 |
| 2,835,521 | White | May 20, 1958 |
| 2,838,436 | Clingman | June 10, 1958 |
| 2,838,829 | Goss | June 17, 1958 |

OTHER REFERENCES

Product Engineering, May 25, 1959, page 60.